United States Patent
Suzuki et al.

(10) Patent No.: US 6,429,539 B1
(45) Date of Patent: Aug. 6, 2002

(54) GENERATOR APPARATUS DRIVEN BY AN INTERNAL COMBUSTION ENGINE WITH START AND STOP CONTROLLERS

(75) Inventors: Hidetoshi Suzuki; Osamu Fukumoto; Makoto Shoji; Tooru Notsu; Hirotsugu Tanaka, all of Numazu (JP)

(73) Assignee: Kokusan Denki Co., Ltd., Numazu (JP)

(*) Notice: Subject to any disclaimer, the term of this patent is extended or adjusted under 35 U.S.C. 154(b) by 0 days.

(21) Appl. No.: 09/543,520

(22) Filed: Apr. 6, 2000

(30) Foreign Application Priority Data

Apr. 7, 1999 (JP) ............................................ 11-099832

(51) Int. Cl.[7] .......................... F02N 11/06; F02N 11/04; H02P 9/04; H02K 23/52
(52) U.S. Cl. ................. 290/40 A; 290/40 C; 290/40 D; 290/22; 290/24; 290/31
(58) Field of Search ..................... 180/65.2; 123/295, 123/445; 73/118; 322/23; 290/40 A (56) References Cited

U.S. PATENT DOCUMENTS

| | | | |
|---|---|---|---|
| 4,214,308 A | * 7/1980 | Carp | 364/431 |
| 4,625,697 A | * 12/1986 | Hosaka | 123/478 |
| 5,231,344 A | * 7/1993 | Marumoto et al. | 322/14 |
| 5,791,145 A | * 8/1998 | Freen | 60/603 |
| 5,838,075 A | * 11/1998 | Yamasaki | 307/10.3 |
| 5,966,000 A | 10/1999 | Yang | 322/23 |
| 6,040,561 A | * 3/2000 | Murty | 219/494 |
| 6,166,525 A | * 12/2000 | Crook | 322/11 |

FOREIGN PATENT DOCUMENTS

| | | | |
|---|---|---|---|
| JP | 405079434 A | * | 3/1993 |
| JP | 02000092896 A | * | 3/2000 |
| JP | 2001003777 A | * | 1/2002 |
| JP | 02001065387 A | * | 3/2002 |

\* cited by examiner

Primary Examiner—Thomas M. Dougherty
Assistant Examiner—Julio Gonzalez Ramirez
(74) Attorney, Agent, or Firm—Pearne & Gordon LLP (57) ABSTRACT

A generator apparatus driven by an internal combustion engine and comprising a revolution controller to control a revolution of the internal combustion engine so as to maintain a desired value of a terminal voltage of a battery which is charged by an output of an AC generator driven by the internal combustion engine while controlling an actuator for operating a fuel supply adjuster, an engine start controller to give a start instruction from a timer circuit to start means when the battery is discharged until the terminal voltage is lowered to a set value and an engine stop controller to give a stop instruction from the timer circuit to stop means when the battery is perfectly charged by the operation of the engine until the revolution of the engine is lowered to a stop revolution thereof whereby the starting and stopping operations of the engine are controlled without undercharging and overcharging the battery.

11 Claims, 3 Drawing Sheets

GENERATOR APPARATUS DRIVEN BY AN INTERNAL COMBUSTION ENGINE WITH START AND STOP CONTROLLERS

TECHNICAL FIELD OF THE INVENTION

This invention pertains to a generator apparatus driven by an internal combustion engine to charge battery by an output of an AC generator driven by the internal combustion engine.

BACKGROUND OF THE INVENTION

A generator apparatus driven by an internal combustion engine to charge a battery by an output of an AC generator driven by the internal combustion engine comprises a revolution controller to control a revolution of the internal combustion engine so as to maintain a deviation between an actual value of a terminal voltage of the battery and a desired value thereof or restrain the deviation to an allowable value or less whereby the terminal voltage of the battery is generally maintained at the desired value thereof.

In order to save a fuel consumed by the internal combustion engine driving such a generator apparatus, the internal combustion engine is preferably controlled to start and stop so that the engine starts when the battery is required to be charged while the engine stops when the battery is perfectly charged.

In order to make such a starting control of the engine and a stopping control thereof, it will be thought out that the engine should start when a detected value of the terminal voltage of the battery is lowered to a first set value indicating a condition in which the engine should start for charging the battery while it should stop when the detected value of the terminal voltage is elevated to a second set value (higher than the first set value) indicating a condition in which the battery is perfectly charged.

However, in case that the revolution controller is provided which controls the revolution of the internal combustion engine so as to maintain a desired value of the terminal voltage of the battery, if the second set value for controlling the stopping of the engine is so set at higher than the desired value of the terminal voltage, then the battery will be disadvantageously overcharged because the internal combustion engine cannot be stopped.

Reversely, if the second set value for controlling the stopping of the engine is so set at a value less than the desired value of the terminal voltage, the battery will be disadvantageously undercharged because the engine is stopped before the battery is perfectly charged.

It will be thought out that, in order to solve such problems, the engine is adapted to be stopped when a detected output current of the generator reaches the designated value or less. However, since this requires a current detecting resistor or a current detecting current transformer to detect the output current, the apparatus will be disadvantageously more expensive in comparison with that detecting the terminal voltage.

SUMMARY OF THE INVENTION

Accordingly, it is an object of the invention to provide an internal combustion engine driven generator apparatus adapted to make a control of engine starting and stopping operations without any requirement of detection of an output current of a generator and without any undercharge and overcharge of a battery whereby a consumption amount of fuel can be saved.

The present invention provides a generator apparatus driven by an internal combustion engine and comprising a revolution controller to control a revolution of the internal combustion engine so as to maintain a deviation between a terminal voltage of a battery which is charged by an output of an AC generator driven by the internal combustion engine and a desired value of the terminal voltage or restrain the difference to an allowable value thereof or less, and engine state controller to make a starting operation of the internal combustion engine when the terminal voltage of the battery is lowered to a set start voltage and an engine stop controller to make a stopping operation of the internal combustion engine when the revolution of the internal combustion engine is lowered to a set stop revolution.

What "start voltage" means is a voltage with which the battery should start to be charged by starting the engine. What "stop revolution" means is a revolution with which the battery is perfectly charged and therefore the engine may be stopped.

As aforementioned, with the engine start controller provided for making a starting operation of the internal combustion engine when the terminal voltage of the battery is lowered to the start voltage and with the engine stopping controller provided for making a stopping operation of the internal combustion engine when the revolution of the internal combustion engine is lowered to the set stop revolution, the internal combustion engine can be started so that the battery is charged when the terminal voltage of the battery is lowered to the voltage with which the battery is required to start to be charged. The internal combustion engine can be stopped when the battery is perfectly charged and therefore the revolution of the engine is lowered to the stop revolution.

In this manner, according to the invention, since the internal combustion engine is adapted to be started when the terminal voltage of the battery is lowered to the predetermined start voltage and adapted to be stopped when the revolution of the engine is lowered to the stop revolution, the start and stop of the engine can be controlled without detecting any output current of the generator by using an expensive current detector means such as a current transformer whereby the fuel consumption can be saved.

In the invention, the engine is stopped when the detected revolution of the engine is lowered to the set stop revolution, but in case that the revolution of the internal combustion engine is so controlled that the deviation between the terminal voltage of the battery and the desired voltage thereof should be restrained to the allowable value or less, since the revolution of the engine is lowered as the charge of the battery advances, the battery can be effectively prevented from being undercharged in the condition that the stop revolution is so properly set when the starting and stopping operations of the engine are controlled.

In the invention, the stop revolution should be preferably adjusted in accordance with the magnitude of the loads connected to the battery. More particularly, if the loads of the battery are relatively smaller and therefore it is hard for the battery to be in the condition of being undercharged, the stop revolution of the engine can be set at a higher value while if the loads connected to the battery are relatively larger and therefore it is easy for the battery to be in the condition of being undercharged, the stop revolution should be set at a lower value. In this manner, the engine can be prevented from being wastefully operated whereby the fuel can be saved and noise can be reduced.

BRIEF DESCRIPTION OF THE DRAWING

The above and other objects and features of the invention will be apparent from the description of the embodiments of the invention taken along with reference to the accompanying drawings in which.

DETAILED DESCRIPTION OF EMBODIMENT OF THE INVENTION

Figure 1:
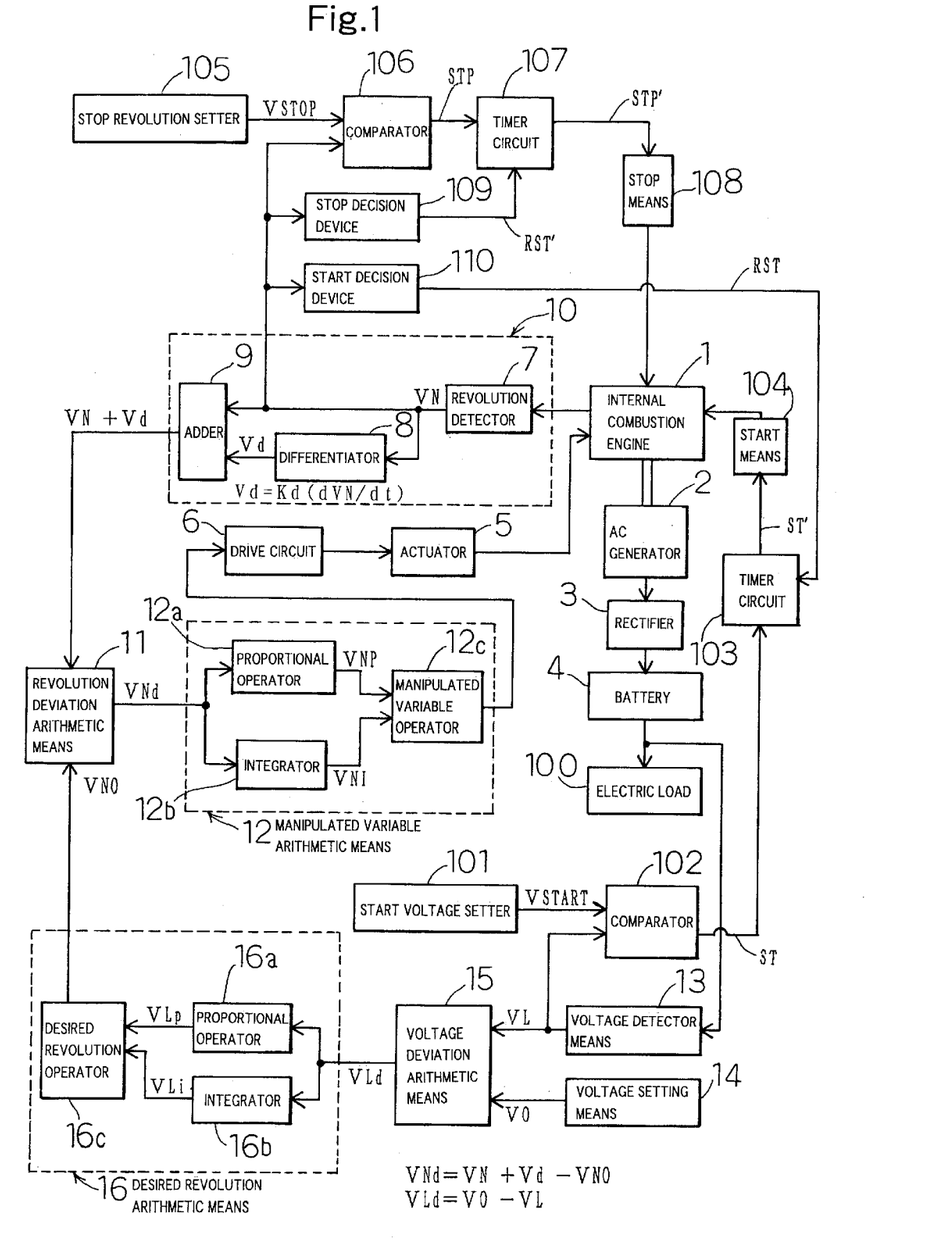
FIG. 1 is a block diagram of a whole system of an internal combustion engine driven generator apparatus constructed in accordance with the invention.

FIG. 1 illustrates a whole system of an internal combustion engine driven generator apparatus constructed in accordance with the invention. In FIG. 1, an AC generator 2 such as a magneto generator may be mounted on one end of an output shaft of an internal combustion engine 1. The internal combustion engine 1 may be either gasoline engine or Diesel engine. The AC generator 2 may comprise a flywheel magnet rotor mounted on the output shaft of the engine and a stator secured to an engine case or an engine cover, for example. It generates an AC voltage from a generator coil provided on the stator. An output of the generator coil of the AC generator 2 is supplied through a rectifier 3 to a battery 4 to which electric loads 100 are connected.

An actuator 5 manipulates a fuel supply amount adjuster to adjust an amount of fuel supplied to the internal combustion engine 1. The actuator 5 is so constructed as to manipulate the fuel supply amount adjuster such as a throttle valve by being driven by a drive source such as an electric motor or an electromagnet The actuator 5 may manipulate the fuel supply amount adjuster by manipulated variable corresponding to the magnitude of a drive current applied from a drive circuit 6.

A revolution detector 7 detects a revolution (the number of revolutions ) (r.p.m.) of the output shaft of the internal combustion engine to generate a signal (voltage signal) VN proportional to the number of revolutions. The signal VN is input to a differentiator 8 and an output Vd of the differentiator 8 and the output signal VN of the revolution detector 7 are input to an adder 9. The adder 9 serves to add the signal VN proportional to the revolution of the engine and a signal Vd=Kd (dVN/dt) obtained by differentiating the signal VN with respect to time to generate the added signal (VN+Vd) as a revolution detection signal. "Kd" expresses a differentiation control constant. In this form, revolution detector means 10 may be formed of the revolution detector 7, the differentiator 8 and the adder 9. The revolution detector means 10 comprises a terminal separate from a terminal from which the signal (VN+Vd) is output as the revolution detection signal. The separate terminal is adapted to output the output signal VN from the revolution detector 7 as the revolution detection signal.

The revolution detector 7 may be in any form as long as it generates a voltage signal having the magnitude proportional to the revolution of the engine. For the revolution detector 7 may be used a generator mounted on the output shaft of the engine to generate a voltage of magnitude proportional to the revolution of the engine or a frequency/voltage converter to convert into a voltage a frequency of a pulse voltage induced in a primary coil of an ignition coil for an ignition system 2 for the internal combustion engine whenever it ignites.

Otherwise, the revolution detector 7 would be formed of a signal generator provided for generating pulse signals at a particular rotary angle of the internal combustion engine for the purpose of controlling an ignition position of the ignition system for the engine and a frequency/voltage converter which converts the frequency of the pulse signals output from the signal generator into a voltage signal. Alternatively, a voltage induced by the generator coil of the AC generator 2 may be used for the signal proportional to the revolution of the engine.

The revolution detection signal (VN+Vd) generated by the revolution detection means 10 is input to a revolution deviation arithmetic means 11 together with a desired revolution signal VN0 indicating a desired revolution of the engine. The revolution deviation arithmetic means 11 arithmetically operates a difference between the revolution detection signal (VN+Vd) and the desired revolution signal VN0 to output a revolution deviation signal VNd (=VN+Vd−VN0) indicating a deviation (revolution deviation) between the revolution of the engine and the desired revolution.

The revolution deviation signal VNd is input to a proportional operator 12a to perform an arithmetic operation of multiplying the signal VNd by a proportional constant Kp and to an integrator 12b to integrate the revolution deviation signal with respect to time. A proportional control signal VNP (=Kp×VNd) output from the proportional operator and an integrated control signal VNI [=KI∫VNd·dt (KI is an integration control constant)] output from the integrator 12b are input to a manipulated variable operator 12c.

The proportional operator 12a, the integrator 12b and the manipulated variable operator 12c, constitute manipulated variable arithmetic means 12 which arithmetically operates the manipulated variable for the fuel supply amount adjuster necessary for maintaining the revolution deviation obtained by the revolution deviation arithmetic means 11 at zero or restraining the revolution to an allowable value or less to give a manipulated variable signal indicating the operated manipulated variable to the drive circuit 6. The drive circuit 6 gives drive current to the actuator 5 so that the fuel supply amount adjuster is manipulated by the manipulated variable obtained by being arithmetically operated by the manipulated variable arithmetic means 12.

Voltage detection means 13 is adapted to detect an output voltage of the AC generator 2 to output a voltage detection signal VL having a magnitude proportional to the detected output voltage. The voltage detection means 13 may be formed of a resistance divider circuit to divide the output voltage of the engine, for example.

Voltage setting means 14 is adapted to output a voltage setting signal V0 indicating a desired output voltage for the generator 2 and may comprise a potentiometer or the like across which a constant DC voltage is applied, for example. The voltage setting signal V0 output by the voltage setting means 14 is applied to voltage deviation arithmetic means 15 together with a voltage detection signal VL. The voltage deviation arithmetic means 15 arithmetically operates a deviation between the output voltage of the generator 2 and the desired output voltage thereof by obtaining a difference between the voltage setting signal V0 and the voltage detection signal VL to output a voltage deviation signal VLd (=V0−VL) indicating the deviation.

Desired revolution arithmetic means 16 arithmetically operates a desired revolution for the internal combustion engine 1 necessary for maintaining the deviation between the output voltage detected by the voltage detection means 13 and the desired output voltage set by the voltage setting means 14 at zero or restraining the deviation to the allowable value or less. The arithmetic means 16 may comprise a proportional operator 16a to proportionally operate the voltage deviation signal VLd to output the proportional control signal VLp, an integrator 16b to integrately operate the voltage deviation signal VLd to output the integrated control signal VLi and a desired revolution operator 16c to arithmetically operate the proportional control signal VLp and the integrated control signal VLi to output a desired revolution signal VN0 indicating the desired revolution.

The proportional operator 16a performs an arithmetic operation of multiplying the voltage deviation signal VLd by the proportional constant Kp' to output a proportional control signal VLp=VLd×Kp'. The integrator 16b integrates the voltage deviation signal with respect to time to output an integrated control signal VLI=KI'∫VLd·dt (KI' is an integration control constant). The desired revolution signal VN0 output by the desired revolution operator 16c is input to the revolution deviation arithmetic means 11.

The voltage detection signal VL output by the voltage detection means 13 is input together with a start voltage setting signal V START output by a start voltage setter 101 to a comparator 102 for generating a start instruction. The output of the comparator 102 is input as a triggering signal to a timer circuit 103 for generating the start instruction. The start voltage setting signal V START is a signal for setting as the start voltage the terminal voltage of the battery with which the internal combustion engine should make a starting operation.

The start instruction generating comparator 102 compares the terminal voltage detected by the voltage detection means 13 with the start voltage given by the start voltage setting signal V START to generate a timer drive signal ST for generating the start instruction by changing the output condition when the detected terminal voltage reaches the start voltage or less. The drive signal ST is applied to the timer circuit 103 for generating the start instruction.

There may be provided a start decision device 110 which compares the revolution detected by receiving the output signal from the revolution detector 7 with a decision value to decide whether the starting operation of the engine is completed or not. The output from the start decision device 110 is applied to a reset terminal of the start instruction generating timer circuit 103 as the reset signal RST.

The start instruction generating timer circuit 103 starts a timing operation when the start instruction generating comparator 102 generates the timer drive signal ST for the start instructions as the terminal voltage of the battery 4 reaches the start voltage or less and makes the timing operation for a predetermined time. When the timing operation terminates, the start instruction ST' is applied to start means 104. When the timer drive signal ST disappears while the timer circuits 103 is making the timing operation or when the start decision device 110 generates the reset signal ST', the timer circuit 103 is reset to be returned to the original condition before the timing operation starts and therefore the output of the start instruction ST' is never generated.

The start means 104 may comprise a starter motor driven while the start instruction ST' is applied, a pinion gear driven by the starter motor and a ring gear provided on a periphery of a flywheel mounted on a crank shaft of the engine. While the start instruction is being applied, the starter motor rotates so that the pinion gear driven by the starter motor is meshed with the ring gear. This drives the crank shaft and starts the engine.

The revolution detection signal VN output by the revolution detector 7 is input to a comparator 106 for generating a stop instruction and a stop decision device 109 as well as the start decision device 110. To the stop instruction generating comparator 106 is applied a stop revolution setting signal V STOP generated by a stop revolution setter 105 together with the revolution detection signal VN.

The stop instruction generating comparator 106 compares the revolution detection signal VN given by the revolution detector 7 with the stop revolution setting signal V STOP given by the stop revolution setter 105 and therefore compares the detected revolution of the engine with the set stop revolution to generate a timer drive signal STP for generating the stop instruction when the detected revolution reaches the stop revolution or less. The timer drive signal STP is applied to a timer circuit 107 for generating the stop instruction.

The stop decision device 109 decides that the engine stops when the revolution of the engine is lowered to a decision value or less to generating a reset signal RST', which is applied to the timer circuit 107.

The stop instruction generating timer circuit 107 starts a timing operation when the timer drive signal STP is given and makes the timing operation for a predetermined time. When the timing operation terminates, the stop instruction STP' is applied to the stop means 108. When the timer drive signal STP disappears while the timer circuits 107 is counting the timing or when the reset signal RST' is applied, the timer circuit 107 stops the timing operation to be returned to the original condition before the timing operation starts and therefore the output of the stop instruction STP' is never generated.

The stop means 108 may be in any form as long as it can stop the internal combustion engine by any means in accordance with the stop instruction. For example, the stop means 108 may be a stop switch which shorts or cuts a part of elements of an ignition system for the internal combustion engine when the stop instruction is given to stop the ignition operation of the engine whereby the engine stops or a stop switch which is turned on so as to short a generation coil for supplying a source voltage to the ignition system for the internal combustion engine or cuts off the generation coil from the ignition system to stop the ignition operation whereby the engine stops. Alternatively, for the stop means may be used an electromagnetic valve which interrupts fuel from being supplied to the engine when the stop instruction is given.

In case that the internal combustion engine is a Diesel engine, for the stop means 108 may be used means to control a drive current from being supplied to an actuator which serves to move a control rack for adjusting an amount of fuel supplied to the internal combustion engine in a direction of stopping the fuel from being supplied.

In the internal combustion engine driven generator apparatus of FIG. 1, the revolution deviation arithmetic means 11 arithmetically operates the deviation between the revolution of the engine detected by the revolution detection means 10 and the desired revolution obtained by the desired revolution arithmetic means 16 as a revolution deviation.

The manipulated variable arithmetic means 12 arithmetically operates the manipulated variable for the fuel supply amount adjuster (the manipulated variable for the actuator) necessary for maintaining the revolution deviation at zero or restraining it to the allowable value or less. The drive circuit 6 operates the actuator 5 by applying thereto the drive current necessary for manipulating the fuel supply amount adjuster by the manipulated variable obtained by the manipulated variable arithmetic means 12. This controls the engine so that the deviation between the revolution of the internal combustion engine and the desired revolution is maintained at zero or restrained to the allowable value or less. Thus, the deviation between the output voltage of the generator and the desired voltage is maintained at zero or at the allowable value or less.

In the example of FIG. 1, a differentiation control signal Vd generated by the differentiator 8 serves to restrain variation in the revolution while the revolution of the engine approaches the desired revolution. As the sum signal of the voltage signal VN proportional to the revolution and the differentiation control signal Vd exceeds the desired revolution signal VN0 given by the desired revolution arithmetic means 16 while the revolution of the engine approaches the desired revolution, a correction operation is made in which the actuator is manipulated in a direction in which the revolution of the engine is lowered. In this manner, with the sum signal of the voltage signal VN proportional to the revolution and the differentiation control signal Vd used for the revolution detection signal, the variation in the revolution of the engine is prevented while the revolution of the engine increases toward the desired revolution and the correction operation starts by limiting the fuel supply amount of the engine before the revolution of the engine exceeds the desired revolution. Therefore, the revolution of the engine can be prevented from largely exceeding the desired revolution so as to be overshot, which can stably control the revolution of the engine.

Figure 2:
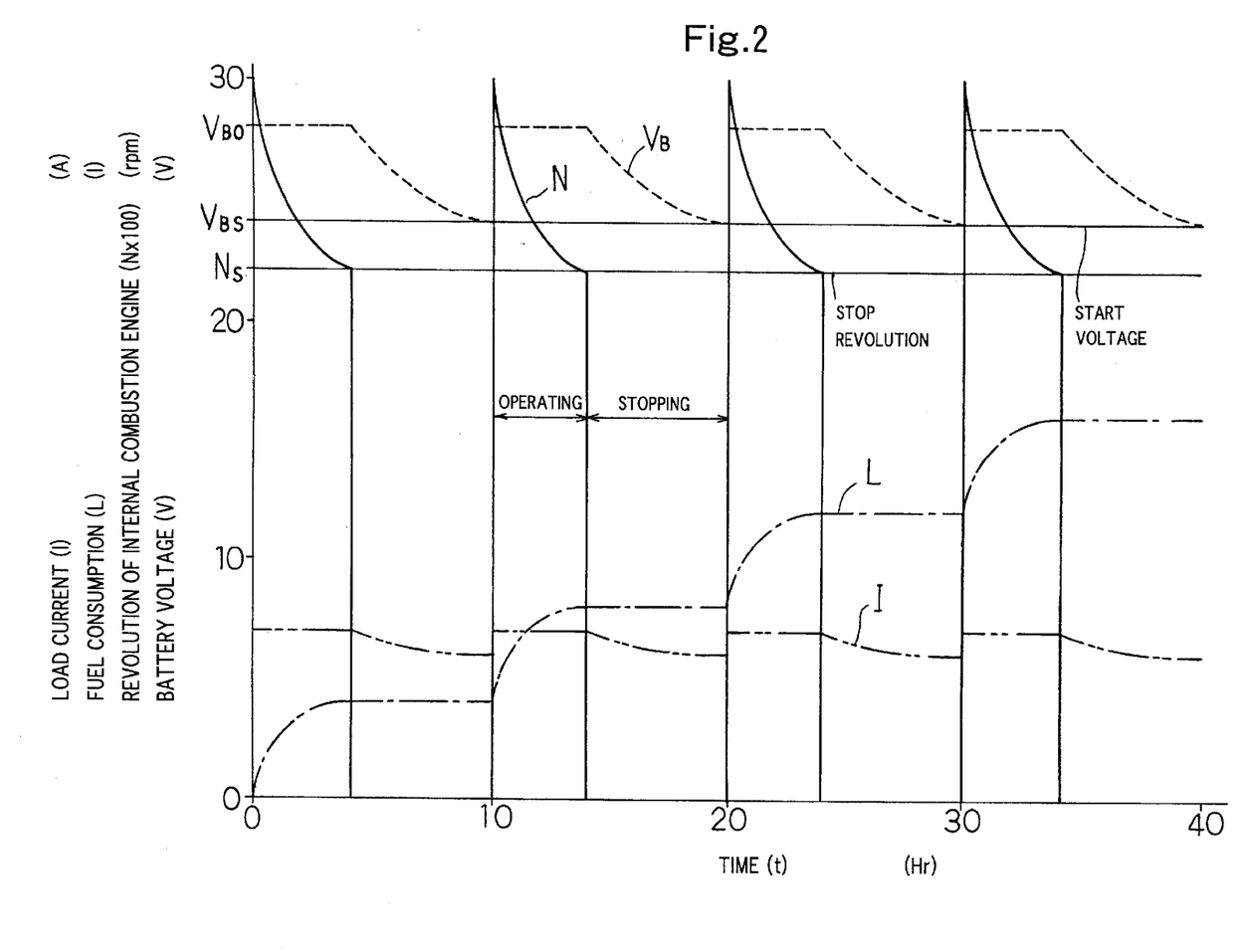
FIG. 2 illustrates how a terminal voltage of a battery charged by the generator apparatus of FIG. 1, a revolution of an internal combustion engine, a load current supplied from the battery to loads and a consumption amount of fuel vary as time lapses.

In the internal combustion engine drive apparatus shown in FIG. 1, as the battery is discharged until the terminal voltage VB thereof is lowered to the start voltage VBs set by the start voltage setter 101 as shown in FIG. 2, the output condition of the comparator 102 changes (from a low level condition to a high level condition, for example) and therefore the comparator 102 generates the timer drive signal ST for generating the start instruction, which causes the start instruction generating timer circuit 103 to start the timing operation.

When the timer circuit 103 completes the timing operation, which implies that the condition in which the terminal voltage VB of the battery 4 is equal to the start voltage VBs or less continues for predetermined time, the timer circuit 103 supplies the start means 104 to be operated to start the internal combustion engine 1. As the internal combustion engine starts, the start decision device 110 resets the timer circuit 103 and therefore it stops the start instruction from being generated, which causes the start means 104 to stop being operated.

When the terminal voltage of the battery momentarily gets less than the start voltage VBS due to some disturbance, but is returned to the value exceeding the start voltage while the timer circuit 103 is making the timing operation so that the start instruction ST' disappears, the timer circuit 103 is reset. Thus, the starting operation of the engine is never made even though the terminal voltage of the battery is momentarily lowered.

As the internal combustion engine starts, the AC generator 2 generates the voltage, which causes a charging current to be supplied to the battery. As the charging of the battery proceeds, the terminal voltage VB of the battery tries to rise, but the revolution N of the engine is so controlled that the terminal of the battery is maintained at the desired voltage as shown in FIG. 2. The revolution N of the engine is lowered as the charging of the battery proceeds.

As the charging of the battery is completed and the revolution of the engine is lowered to the stop revolution Ns set by the stop revolution setter 105, the revolution detection signal VN reaches the stop revolution setting signal VSTOP or less and as a result, the comparator 106 for generating the stop instruction generates the timer drive signal STP for generating the stop instruction. Thus, the timer circuit 107 for generating the stop instruction starts the timing operation and when it completes the timing operation, the stop instruction STP' is generated by the timer circuit 107. As the stop instruction STP' is generated, the stop means 108 is operated to stop the internal combustion engine. As the internal combustion engine 1 stops, the stop decision device 109 supplies the reset signal to the timer circuit 107 for generating the stop instruction and therefore the timer circuit 107 stops the output of the stop instruction STP'.

In the generator apparatus of FIG. 1, a revolution controller to control the revolution of the internal combustion engine so as to restrain the deviation between the terminal voltage of the battery and the desired voltage to the allowable value or less may be formed of the actuator 5 to manipulate the fuel supply amount adjuster to the internal combustion engine, the revolution detection means 10 to generate the revolution detection signal having the magnitude proportional to the revolution of the engine 1 detected by the revolution 11 detector, the voltage detection means 13 to detect the terminal voltage of the battery 4, the voltage setting means 14 to give the desired terminal voltage of the battery, the desired revolution arithmetic means 16 to arithmetically operate the desired revolution of the internal combustion engine necessary for maintaining the deviation between the terminal voltage of the battery detected by the voltage detection means 13 and the desired terminal voltage given by the voltage setting means 14 at zero or restraining the deviation to the allowable value or less, the revolution deviation arithmetic means 11 to arithmetically operate the difference between the revolution of the internal combustion engine given by the revolution detection signal and the desired revolution for the revolution deviation, the manipulated variable arithmetic means 12 to arithmetically operate the manipulated variable for the fuel supply amount adjuster necessary for maintaining the revolution deviation at zero or restraining the revolution deviation to the allowable value or less and the drive circuit 6 to supply the drive current to the actuator 5 so that the fuel supply amount adjuster of the internal combustion engine is manipulated by the manipulated variable obtained by the manipulated variable arithmetic means 12.

In this revolution controller, a revolution control loop is formed of a loop of the internal combustion engine 1, the revolution detection means 10, the revolution deviation arithmetic means 11, the manipulated variable arithmetic means 12, the drive circuit 6, the actuator 5 and again the internal combustion engine 1 while a voltage control loop is formed of a loop of the internal combustion engine 1, the generator 2, the rectifier 3, the battery 4, the voltage detection means 13, the voltage deviation arithmetic means 15, the desired revolution arithmetic means 16, the revolution deviation arithmetic means 11, the manipulated variable arithmetic means 12, the drive circuit 6, the actuator 5 and again the internal combustion engine 1.

With the revolution controller constructed as aforementioned, the revolution of the engine can be prevented from rising beyond the allowable range even though the loads of the generator increase. Thus, it will be noted that the engine is prevented from shortening its life or being damaged due to the excessive increase of the engine revolution even though the loads of the generator increase.

In the internal combustion engine driven generator apparatus shown in FIG. 1, the engine start controller is provided which may comprise the voltage detection means 13 to detect the terminal voltage of the battery, the start voltage setter 101 to give the start voltage which is the terminal voltage at which the internal combustion engine starts, the start instruction generator means including the comparator 102 and the start instruction generating timer circuit 103 to generate the start instruction when the terminal voltage of the battery is lowered to the start voltage given by the start voltage setter 101 and the start means 104 to start the internal combustion engine when the start instruction is generated.

In other words, the engine start controller is formed by a loop of the internal combustion engine 1, the voltage detection means 13, the comparator 102, the start instruction generating timer circuit 103, the start means 104 and again the internal combustion engine 1.

With the start instruction generator means formed of the comparator 102 and the start instruction generating timer circuit 103 as aforementioned, since the engine starts only when the terminal voltage of the battery continues to be the start voltage or less for more than predetermined time, the engine is prevented from being unstably controlled so that the engine stops immediately after it starts when the terminal voltage of the battery reaches the start voltage of less due to the momentary disturbance.

In case that the start instruction generation means is constructed as aforementioned, the engine start controller may preferably comprise the start decision device 110 to decide on the revolution detected by the revolution detection means 10 whether the starting operation of the internal combustion engine is completed or not to reset the start instruction generating timer circuit when it decides that the starting operation of the engine is completed.

In this manner, with the start decision device 110 provided, the invention can be applied even to the generator apparatus which has no means to stop the electric power from being supplied to the starter motor by detecting the completion of the starting operation of the engine on the starter of the internal combustion engine.

As shown in FIG. 1, as the control loop is provided which controls the internal combustion engine 1 so as to maintain the deviation between the revolution of the engine 1 and the desired revolution at zero or to restrain it to the allowable value or less and the desired revolution arithmetic means 16 is also provided which arithmetically operates the desired revolution of the engine necessary for maintaining the deviation between the output voltage of the generator 2 and the desired voltage at the allowable value or less to determine the desired revolution obtained by the desired revolution arithmetic means for the desired revolution of the control loop, the revolution of the engine can be prevented from rising beyond the allowable range even though the loads of the generator increase. Thus, it will be noted that the engine is prevented from shortening its life or being damaged due to the excessive increase of the engine revolution even though the loads of the generator increase.

In the internal combustion engine driven generator apparatus shown in FIG. 1, the engine stop controller is formed of the revolution detection means 10 to detect the revolution of the internal combustion engine, the stop revolution setter 105 to give the stop revolution which is the revolution at which the internal combustion engine should stop, the stop instruction generation means including the comparator 106 and the stop instruction generating timer circuit 107 to generate the stop instruction when the revolution detected by the revolution detection means 10 is lowered to the stop revolution given by the stop revolution setter 105 and the stop means 108 to make a stopping operation of the internal combustion engine when the stop instruction is generated.

In other words, the engine stop controller is formed by a loop of the internal combustion engine 1, the revolution detector 7, the comparator 106, the stop instruction generating timer circuit 107, the stop means 108 and again the internal combustion engine 1.

With the stop instruction generator means formed of the stop instruction generating comparator 106 to compare the revolution detected by the revolution detection means 10 with the stop revolution given by the stop revolution setting means 105 to generate the stop instruction when the detected revolution reaches the stop revolution or less and the stop instruction generating timer circuit 107 to make the timing operation for the set time while the stop instruction generating comparator 106 is generating the stop instruction generating timer device signal and to generate the stop instruction when the timing operation is completed as aforementioned, the engine can be prevented from being unstably operated so that the engine starts immediately after is stops when the revolution of the engine is lowered to the stop revolution or less due to the momentary disturbance.

In case that the engine stop controller is constructed as aforementioned, the stop decision device 109 may be preferably provided which decides on the revolution detected by the revolution detection means 10 whether the internal combustion engine stops or not to reset the engine stopping timer circuit when it decides that the engine stops.

In this manner, with the stop decision device 109 provided, since the stop means continues to be operated until the stop of the engine is confirmed, the engine can be positively stopped.

In order to stop such an internal combustion engine as uses an ignition system driven by the output of the AC generator may be conventionally used a self-holding switch which is held in a turned-on condition while the AC generator is generating the output when the stop instruction is given by a pushbutton switch or the like to stop the ignition system by shorting the output of the AC generator or a part of the elements of the ignition system by means of the self-holding switch. In case that such self-holding stop means is used, the stop decision device as aforementioned will not be required.

Figure 3:
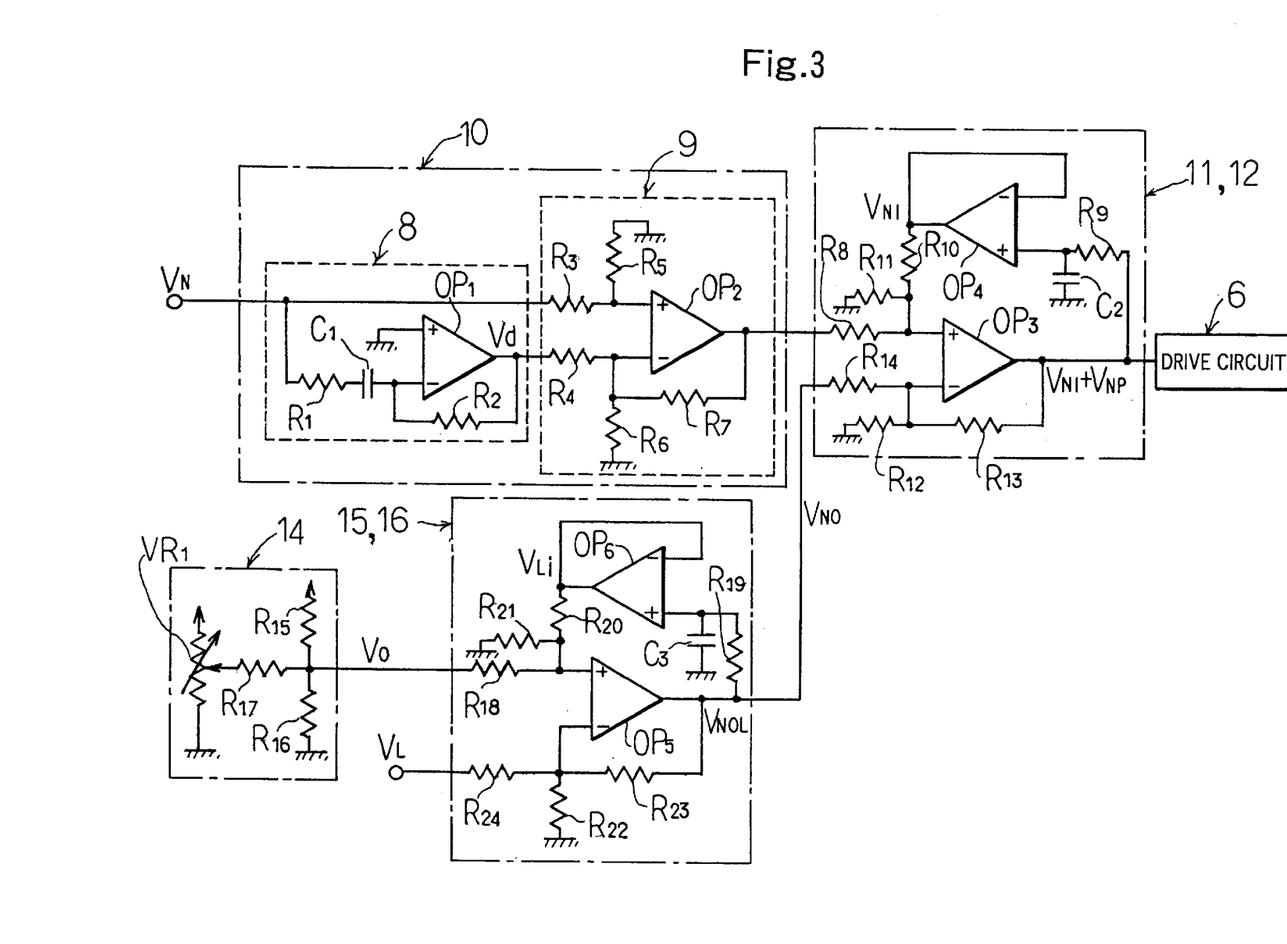
FIG. 3 illustrates a circuit of a revolution controller used for the generator apparatus of FIG. 1 constructed in accordance with a concrete example of the invention.

In FIG. 3 is shown a concrete embodiment of the revolution controller for the generator apparatus of FIG. 1. In the embodiment shown in FIG. 3, a differentiator 8 may be formed of an operational amplifier OP1 having a positive phase input terminal connected to the ground, a capacitor C1 at one end connected to a reverse phase input terminal of the operational amplifier OP1, a resistance R1 at one end connected to another end of the capacitor C1 and a feedback resistance R2 connected between an output terminal of the operational amplifier OP1 and the reverse phase input terminal thereof. The voltage signal VN obtained from the revolution detector not shown in FIG. 3 is input to the differentiator 8 across the other end of the resistance R1 and the ground. The differential circuit 8 outputs the differentiation control signal Vd by differentiating the voltage signal VN with respect to time.

An adder 9 may be formed of an operational amplifier OP2, resistances R3 and R4 at one end connected to the positive phase input terminal of the operational amplifier OP2 and the reverse phase input terminal thereof, respectively, resistances R5 and R6 connected between the positive input terminal of the operational amplifier OP2 and the ground and between the reverse phase input terminal of the operational amplifier OP2 and the ground, respectively and a feedback resistance R7 connected between an output terminal of the operational amplifier OP2 and the reverse phase input terminal thereof. The voltage signal VN obtained by the revolution detector is input through the resistance R3 to the positive phase input terminal of the operational amplifier OP2 and the differentiation control signal Vd obtained by the differentiator 8 is input through the resistance R4 to the reverse phase input terminal of the operational amplifier OP2. The adder 9 outputs the sum signal (VN+Vd) of the differentiation control signal Vd and the voltage signal VN proportional to the revolution for the revolution detection signal.

The output terminal of the operational amplifier OP2 is connected through a resistance R8 to a positive phase input terminal of an operational amplifier OP3. To an output terminal of the operational amplifier OP3 is connected an end of a resistance R9 and an integrating capacitor C2 is connected between other end of the resistance R9 and the ground. To the other end of the resistance R9 is also connected a positive phase input terminal of an operational amplifier R4 having an output terminal and a reverse phase input terminal connected directly to each other. The output terminal of the operational amplifier OP4 is connected through a resistance R10 to the positive phase input terminal of the operational amplifier OP3. Resistances R11 and R12 are connected between the positive input terminal of the operational amplifier OP3 and the ground and between the reverse phase input thereof and the ground, respectively and a feedback resistance R13 is connected between the output terminal of the operational amplifier OP3 and the reverse phase input terminal thereof. An end of a resistance R14 is connected to the reverse phase input terminal of the operational amplifier OP3. The desired revolution signal VN0 is input through the resistance R14 to the reverse phase input terminal of the operational amplifier OP3.

In the illustrated embodiment, the integrator 12b of FIG. 1 comprises the operational amplifier OP3, the operational amplifier OP4 to which the output of the operational amplifier OP3 is input, the integrating capacitor C2 and the resistances R8 through R13. The integration control signal VNI is obtained at the output terminal of the operational amplifier OP4. The operational amplifier OP3 serves to make the perfect integration operation over the whole range of variation in frequency. The revolution deviation arithmetic means 11, the proportional operator 12a and the manipulated variable operator 12c comprise the operational amplifier OP3 and the resistances R8 through R13. The manipulated variable signal (VNI+VNP) indicating the manipulated variable for the fuel supply amount adjuster of the internal combustion engine is obtained at the output terminal of the operational amplifier OP3.

More particularly, in the embodiment shown in FIG. 3, the voltage setting means 14 comprises a potentiometer VR1 across both ends of which a constant DC voltage is applied, a series circuit of resistances R15 and R16 across both ends of which the constant DC voltage is applied and a resistance R17 connected between the connection point of the resistances R15 and R16 and the terminal of the potentiometer VR1 communicating with the wiper thereof. Across both ends of the resistance R16 is obtained the voltage setting signal V0 which corresponds to the desired output voltage of the generator. The voltage setting signal V0 can be properly regulated by adjusting the position of the wiper of the potentiometer VR1.

Also, in the embodiment shown in FIG. 3, the voltage deviation arithmetic means 15 and the desired revolution arithmetic means 16 of FIG. 1 comprise operational amplifiers OP5 and OP6, a capacitor C3 and resistances R18 through R24. The circuit to form the voltage deviation arithmetic means 15 and the desired arithmetic means 16 is constructed in the same manner as the circuit to form the revolution deviation arithmetic means 11 and the manipulated variable arithmetic means 12. The integrator 15b of FIG. 1 comprises the operational amplifier OP5, the operational amplifier OP6 to which the output of the operational amplifier OP5 is input, the integrating capacitor C3 and the resistances R18 through R23. The voltage deviation arithmetic means 15, the proportional operator 16a and the desired revolution operator 16c comprise the operational amplifier OP5 and the resistances R18 through R23.

The voltage setting signal V0 and the voltage detection signal VL are input through the resistances R18 and R24 to the positive phase input terminal of the operational amplifier OP5 and the reverse phase input terminal thereof, respectively and the integration control signal VLi is obtained at the output terminal of the operational amplifier OP6 while the desired revolution signal VNOL indicating the desired revolution of the engine necessary for maintaining the deviation between the output voltage of the generator and the desired output voltage at zero or restraining the deviation to the allowable value or less is obtained at output terminal of the operational amplifier OP5.

Although, in the embodiment shown in FIG. 3, various parts of the control apparatus may be formed of analogue circuits, the revolution detection means 10, the revolution deviation arithmetic means 11, the manipulated variable arithmetic means 12, the voltage deviation arithmetic means 15 and the desired revolution arithmetic means 16 may be formed by using a microcomputer.

In the aforementioned description, the timer circuit 103 is reset to be returned to the condition prior to the start of the timing operation when the comparator 102 stops generating the start instruction generating timer drive signal ST while the timing operation of the timer circuit 103 is proceeding, but the timing operation of the timer circuit 103 may be interrupted when the comparator 102 stops generating the start instruction generating timer drive signal ST while the timing operation of the timer circuit 103 is proceeding and the timing operation again continues from the interruption of the timing operation when the comparator 102 again generates the start instruction generating timer drive signal. In other words, the timer circuit 103 for generating the start instruction may be adapted to apply the start instruction to the start means 104 when the integrated value of time for which the terminal voltage of the battery is maintained at the start voltage or less reaches the predetermined value.

Similarly, in the aforementioned embodiment, the timer circuit 107 is reset to be returned to the condition prior to the start of the timing operation when the comparator 106 stops generating the stop instruction generating timer drive signal STP while the timing operation of the timer circuit 107 is proceeding, but the timing operation of the timer circuit 107 may be interrupted when the comparator 106 stops generating the stop instruction generating timer drive signal STP while the timing operation of the timer circuit 107 is proceeding and the timing operation again continues from the interruption of the timing operation when the comparator 106 again generates the stop instruction generating timer drive signal. In other words, the timer circuit 107 for generating the stop instruction may be adapted to apply the stop instruction to the stop means 108 when the integrated value of time for which the revolution of the engine is maintained at the stop revolution of less reaches the predetermined value.

Although in the embodiment shown in FIG. 1, the control loop is provided for controlling the deviation between the revolution of the internal combustion engine and the desired revolution to be restrained within the allowable range and the desired revolution arithmetic means 16 is provided which arithmetically operates the desired revolution of the engine necessary for maintaining the deviation between the output voltage of the AC generator 2 and the desired output voltage at zero or restraining the deviation to the allowable value or less whereby the desired revolution obtained by the desired revolution arithmetic means is adapted to be used for the desired revolution of the control loop, the invention may be modified in various manners so long as the revolution controller is provided which controls the revolution of the internal combustion engine so that the deviation between the output voltage of the generator and the desired voltage is maintained at zero or restrained within the allowable range. The revolution controller may be so constructed that the drive current is applied to the actuator by arithmetically operating the manipulated variable of the actuator on the deviation between the output voltage of the generator and the desired voltage and manipulating the actuator by the obtained manipulated variable whereby the deviation between the output voltage of the AC generator 2 and the desired output voltage is maintained at zero or within the allowable range.

According to the invention, since the internal combustion engine is adapted to start when the terminal voltage of the battery is lowered to the predetermined start voltage and to stop when the revolution of the engine is lowered to the stop revolution, the starting and stopping operations of the engine can be controlled without detecting the output current of the generator by using an expensive current detection means such as a current transformer and therefore the fuel consumption can be effectively saved.

Also, in the invention, since the control loop is provided for controlling the deviation between the revolution of the internal combustion engine and the desired revolution to be restrained within the allowable range and the desired revolution arithmetic means is provided which arithmetically operates the desired revolution of the engine necessary for maintaining the deviation between the output voltage of the generator and the desired output voltage at zero or within the allowable range whereby the desired revolution obtained by the desired revolution arithmetic means is used for the desired revolution of the control loop, the revolution of the engine can be not only prevented from rising beyond the allowable range even though the loads of the generator increase, but also the engine can be prevented from shortening its life or being damaged due to the excessive increase of the engine revolution even though the loads of the generator increase.

Although some preferred embodiments have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A generator apparatus driven by an internal combustion engine and comprising
    an internal combustion engine;
    an AC generator driven by said internal combustion engine;
    a battery to be charged by a rectified output of said AC generator;
    a revolution controller to control a revolution of said internal combustion engine so as to maintain a deviation between a terminal voltage of said battery and a desired terminal voltage at an allowable value or less;
    an engine start controller to make a start operation of said internal combustion engine when said terminal voltage of said battery is lowered to a set start voltage;
    and an engine stop controller to make a stop operation of said internal combustion engine when said revolution of said internal combustion engine is lowered to a set stop revolution.

2. A generator apparatus driven by an internal combustion engine and comprising an internal combustion engine;
    an AC generator driven by said internal combustion engine;
    a battery to be charged by a rectified output of said AC generator;
    a revolution controller to control a revolution of said internal combustion engine so as to maintain a deviation between a terminal voltage of said battery and a desired terminal voltage at an allowable value or less
    an engine start controller having voltage detection means to detect said terminal voltage of said battery, start voltage setting means to apply a start voltage for said terminal voltage of said battery when said internal combustion engine should start, start instruction generation means to generate a start instruction when said terminal voltage of said battery detected by said voltage detection means is lowered to said start voltage applied by said start voltage setting means and start means to make a start operation of said internal combustion engine when said start instruction is generated;
    and an engine stop controller having revolution detection means to detect said revolution of said internal combustion engine, stop revolution setting means to apply a stop revolution for said internal combustion engine when said internal combustion engine should stop, stop instruction generation means to generate a stop instruction when said revolution of said internal combustion engine detected by said revolution detection means is lowered to said stop revolution applied by said stop revolution setting means and stop means to make a stop operation of said internal combustion engine when said stop instruction is generated.

3. A generator apparatus driven by an internal combustion engine as set forth in claim 2 and wherein said start instruction generation means comprises a comparator for generating said start instruction to compare said terminal voltage of said battery with said start voltage applied by said start voltage setting means to generate start instruction generating timer drive instruction when said detected voltage is lowered to said start voltage or less and a timer circuit for generating said start instruction to make a timing operation for a set time while said comparator for generating said start instruction is generating said timer drive instruction and to generate said start instruction when said timing operation is completed.

4. A generator apparatus driven by an internal combustion engine as set forth in claim 2 and wherein said stop instruction generation means comprises a comparator for generating said stop instruction to compare said revolution of said internal combustion engine with said stop revolution applied by said stop revolution setting means to generate stop instruction generating timer drive instruction when said detected revolution is lowered to said stop revolution or less and a timer circuit for generating said stop instruction to make a timing operation for a set time while said comparator for generating said stop instruction is generating said timer drive instruction and to generate said stop instruction when said timing operation is completed.

5. A generator apparatus driven by an internal combustion engine as set forth in claim 2 and wherein said start instruction generation means comprises a comparator for generating said start instruction to compare said terminal voltage of said battery with said start voltage applied by said start voltage setting means to generate start instruction generating timer drive instruction when said detected voltage is lowered to said start voltage or less and a timer circuit for generating said start instruction to make a timing operation for a set time while said comparator for generating said start instruction is generating said timer drive instruction and to generate said start instruction when said timing operation is completed;

and wherein said stop instruction generation means comprises a comparator for generating said stop instruction to compare said revolution of said internal combustion engine with said stop revolution applied by said stop revolution setting means to generate stop instruction generating timer drive instruction when said detected revolution is lowered to said stop revolution or less and a timer circuit for generating said stop instruction to make a timing operation for a set time while said comparator for generating said stop instruction is generating said timer drive instruction and to generate said stop instruction when said timing operation is completed.

6. A generator apparatus driven by an internal combustion engine as set forth in claim 2 and wherein said start instruction generation means comprises a comparator for generating said start instruction to compare said terminal voltage of said battery with said star voltage applied by said start voltage setting means to generate starting instruction generating timer drive instruction when said detected voltage is lowered to said start voltage or less and a timer circuit for generating said start instruction to make a timing operation for a set time while said comparator for generating said start instruction is generating said timer drive instruction and to generate said start instruction when said timing operation is completed;

wherein said stop instruction generation means comprises a comparator for generating said stop instruction to compare said revolution of said internal combustion engine with said stop revolution applied by said stop revolution setting means to generate stop instruction generating timer drive instruction when said detected revolution is lowered to said stop revolution or less and a timer circuit for generating said stop instruction to make a timing operation for a set time while said comparator for generating said stop instruction is generating said timer drive instruction and to generate said stop instruction when said timing operation is completed;

wherein said engine start controller further comprises a start decision device to decide whether said starting operation of said internal combustion engine is completed or not and to reset said start instruction generating timer circuit when said start decision device decides that said starting operation is completed;

and wherein said engine stop controller further comprises a stop decision device to decide whether said internal combustion engine stops or not and to reset said engine stopping timer circuit when said stop decision device decides that said internal combustion engine stops.

7. A generator apparatus driven by an internal combustion engine and comprising an internal combustion engine;

an AC generator driven by said internal combustion engine;

a battery to be charged by a rectified output of said AC generator;

a revolution controller to control a revolution of said internal combustion engine so as to maintain a deviation between a terminal voltage of said battery and a desired terminal voltage at an allowable value or less;

an engine start controller to make a start operation of said internal combustion engine when said terminal voltage of said battery is lowered to a set start voltage;

an engine stop controller to make a stop operation of said internal combustion engine when said revolution of said internal combustion engine is lowered to a set stop revolution;

said revolution controller comprising an actuator to manipulate a fuel supply amount adjuster of said internal combustion engine in accordance with a given drive current, revolution detection means to detect said revolution of said internal combustion engine to generate a revolution detection signal proportional to said detected revolution, voltage setting means to detect said terminal voltage of said battery, desired revolution arithmetic means to arithmetically operate a desired revolution of said internal combustion engine necessary for maintaining a deviation between said terminal voltage of said battery detected by said voltage detection means and said desired voltage applied by said voltage setting means at an allowable value or less, revolution deviation arithmetic means to arithmetically operate for a revolution deviation a difference between said revolution of said internal combustion engine given by said revolution detection signal and said desired revolution, manipulated variable arithmetic means to arithmetically operate a manipulated variable for said fuel supply amount adjuster necessary for maintaining said revolution deviation at an allowable value or less, a drive circuit to apply said drive current to said actuator so that said fuel supply amount adjuster is manipulated by said manipulated variable obtained by said manipulated variable arithmetic means and said desired revolution arithmetic means being so constructed that said desired revolution is limited to an upper value of an allowable revolution range of said internal combustion engine or less;

an engine start controller having voltage detection means to detect said terminal voltage of said battery, start voltage setting means to apply a start voltage for said terminal voltage of said battery when said internal combustion engine should start, start instruction generation means to generate a start instruction when said terminal voltage of said battery detected by said voltage detection means is lowered to said start voltage applied by said start voltage setting means and start means to make a starting operation of said internal combustion engine when said start instruction is generated;

and an engine stop controller having revolution detection means to detect said revolution of said internal combustion engine, stop revolution setting means to apply a stop revolution for said revolution of said internal combustion engine when said internal combustion engine should stop, stop instruction generation means to generate a stop instruction when said revolution of said internal combustion engine detected by said revolution detection means is lowered to said stop revolution applied by said stop revolution setting means and stop means to make a stop operation of said internal combustion engine when said stop instruction is generated.

8. A generator apparatus driven by an internal combustion engine as set forth in claim 7 and wherein said start instruction generation means comprises a comparator for generating said start instruction to compare said terminal voltage of said battery with said start voltage applied by said start voltage setting means to generate start instruction generating timer drive instruction when said detected voltage is lowered to said start voltage or less and a timer circuit for generating said start instruction to make a timing operation for a set time while said comparator for generating said start instruction is generating said timer drive instruction and to generate said start instruction when said timing operation is completed.

9. A generator apparatus driven by an internal combustion engine as set forth in claim 7 and wherein said stop instruction generation means comprises a comparator for generating said stop instruction to compare said revolution of said internal combustion engine with said stop revolution applied by said stop revolution setting means to generate stop instruction generating timer drive instruction when said detected revolution is lowered to said stop revolution or less and a timer circuit for generating said stop instruction to make a timing operation for a set time while said comparator for generating said stop instruction is generating said timer drive instruction and to generate said stop instruction when said timing operation is completed.

10. A generator apparatus driven by an internal combustion engine as set forth in claim 7 and wherein said start instruction generation means comprises a comparator for generating said start instruction to compare said terminal voltage of said battery with said star voltage applied by said start voltage setting means to generate starting instruction generating timer drive instruction when said detected voltage is lowered to said start voltage or less and a timer circuit for generating said start instruction to make a timing operation for a set time while said comparator for generating said start instruction is generating said timer drive instruction and to generate said start instruction when said timing operation is completed;

and wherein said stop instruction generation means comprises a comparator for generating said stop instruction to compare said revolution of said internal combustion engine with said stop revolution applied by said stop revolution setting means to generate stop instruction generating timer drive instruction when said detected revolution is lowered to said stop revolution or less and a timer circuit for generating said stop instruction to make a timing operation for a set time while said comparator for generating said stop instruction is generating said timer drive instruction and to generate said stop instruction when said timing operation is completed.

11. A generator apparatus driven by an internal combustion engine as set forth in claim 7 and wherein said start instruction generation means comprises a comparator for generating said start instruction to compare said terminal voltage of said battery with said start voltage applied by said start voltage setting means to generate starting instruction generating timer drive instruction when said detected voltage is lowered to said start voltage or less and a timer circuit for generating said start instruction to make a timing operation for a set time while said comparator for generating said start instruction is generating said timer drive instruction and to generate said start instruction when said timing operation is completed;

wherein said stop instruction generation means comprises a comparator for generating said stop instruction to compare said revolution of said internal combustion engine with said stop revolution applied by said stop revolution setting means to generate stop instruction generating timer drive instruction when said detected revolution is lowered to said stop revolution or less and a timer circuit for generating said stop instruction to make a timing operation for a set time while said comparator for generating said stop instruction is generating said timer drive instruction and to generate said stop instruction when said timing operation is completed;

wherein said engine start controller further comprises a start decision device to decide whether said starting operation of said internal combustion engine is completed or not and to reset said start instruction generating timer circuit when said start decision device decides that said starting operation is completed;

and wherein said engine stop controller further comprises a stop decision device to decide whether said internal combustion engine stops or not and to reset said engine stopping timer circuit when said stop decision device decides that said internal combustion engine stops.

* * * * *